Oct. 10, 1967 E. BLANK 3,346,790
LOW INDUCTANCE HIGH VOLTAGE CAPACITOR
Filed Feb. 18, 1960 3 Sheets-Sheet 1

INVENTOR.
EDWARD BLANK
BY
Ezekiel Wolf, Wolf & Greenfield
ATTORNEYS

Oct. 10, 1967  E. BLANK  3,346,790
LOW INDUCTANCE HIGH VOLTAGE CAPACITOR
Filed Feb. 18, 1960  3 Sheets-Sheet 2

*INVENTOR.*
EDWARD BLANK
BY
*Ezekiel Wolf, Wolf & Greenfield*
ATTORNEYS

Oct. 10, 1967 E. BLANK 3,346,790
LOW INDUCTANCE HIGH VOLTAGE CAPACITOR
Filed Feb. 18, 1960 3 Sheets-Sheet 3

INVENTOR.
EDWARD BLANK
BY
*Ezekiel Wolf, Wolf & Greenfield*
ATTORNEYS

United States Patent Office 3,346,790
Patented Oct. 10, 1967

3,346,790
LOW INDUCTANCE HIGH VOLTAGE CAPACITOR
Edward Blank, Sharon, Mass., assignor to Tobe Deutschmann Laboratories, Canton, Mass., a partnership composed of Edward Blank and Tobe Deutschmann
Filed Feb. 18, 1960, Ser. No. 9,551
13 Claims. (Cl. 317—261)

This invention relates to a high voltage capacitor and more particularly to the types of high voltage capacitors used for energy storage and/or fast discharge where the lowest inductance possible is desired. The invention also relates to a method of making capacitors of such a nature.

Capacitors have previously been used as energy storage devices when it is desired to extract the maximum amount of storage energy in the shortest possible time. However, existing capacitors are not too satisfactory for this application because of the inherent inductance of the capacitor itself, which limits the peak power available and maximum rate of discharge possible. In low inductance energy storage systems, it is often desirable to have a high Q circuit. At other times it is desirable to have a low Q circuit by virtue of a low Q load, although a low Q cannot always be obtained by adjusting the load.

It is therefore an object of the present invention to provide a high voltage, high capacity capacitor having extremely low inductance and a Q which may be high or low depending upon the desired application. It is a further object of the present invention to provide a high voltage, low inductance, parallel plate energy storage capacitor made by laminating thermoplastic dielectric materials between alternate layers of conducting plates with appropriate margins, voltage gradation elements, terminations, and electrostatic shielding. A further object of the present invention is to provide a capacitor requiring no further electrical insulation or impregnation. It is a further object of the present invention to provide a fixed capacitor that can be readily manufactured with stable electrical characteristics. A further object of the present invention is to provide a high voltage, low inductance capacitor which is sturdy and moisture proof and which will stand up under normal laboratory and operating conditions.

The present invention is primarily designed for use in either energy storage capacitors or light source capacitors and for that reason has substantial versatility in its use. When used in energy storage capacitors, the present invention provides a particularly useful device for connection to parallel transmission lines. In such connections extremely low inductance high energy connections are possible. Such high energy devices are particularly useful for multiple unit connections where high energy is desired. High energy outputs are also possible with devices of the nature herein described by connecting banks of these together in a low inductance arrangement.

In the embodiment primarily designed for use as a light source, the unit is primarily adapted to provide a high capacitance low inductance capacitor. This arrangement may also be used for coaxial cable termination wherein the cable is axially located with respect to the capacitor.

While the capacitor designed for light source applications is inherently a high Q capacitor, it may be utilized in light source circuits having low Q properties. This is desirable in many instances where no oscillations in the circuit are desired. This capacitor when used in low Q circuits, will nonethless, still discharge rapidly as the resistance is in the same magnitude as the inductance which is low. In other words, the capacitor when used in light source applications may, if desired, be used in a circuit having a low inductance and low Q as well as in circuits having a low inductance and high Q.

These and other objects and advantages of the present invention will be more clearly understood when considered in connection with the accompanying drawings in which.

Figure 4:
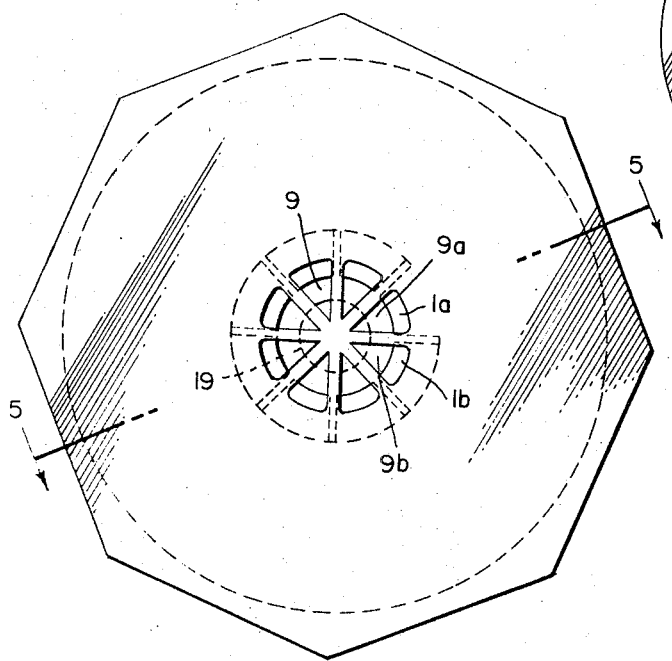
FIG. 4 is a plan view of the light source capacitor without terminations.
Figure 3:
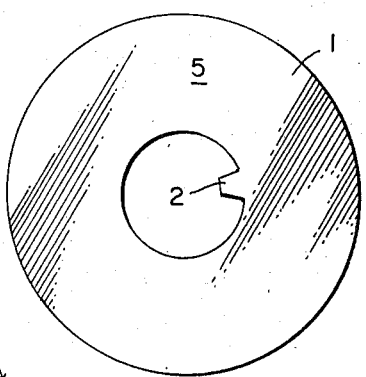
Figure 5:
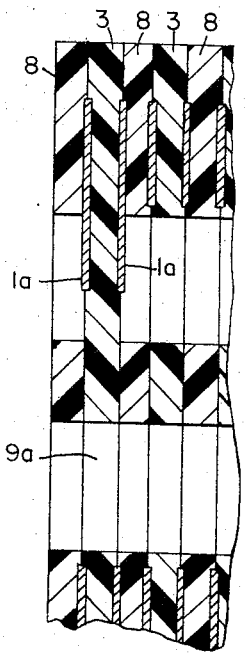
FIG. 5 is a fragmentary enlarged cross section of the light source capacitor taken substantially along the line 5—5 of FIG. 4.
Figure 6:
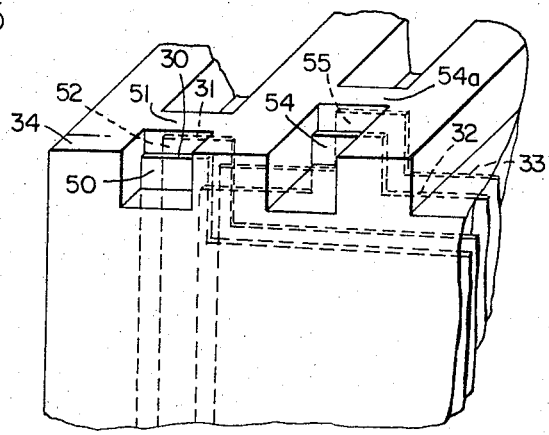
FIG. 6 is a perspective view of an embodiment of the present invention primarily designed for energy storage purposes.
Figure 7A:
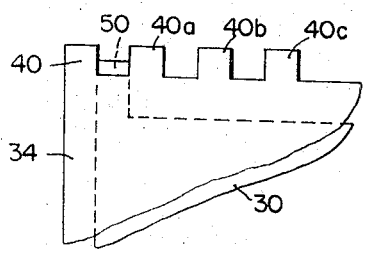
FIGS. 7a, 7b, 7c and 7d are fragmentary plan views of components of the embodiment illustrated in FIG. 6.
Figure 7B:
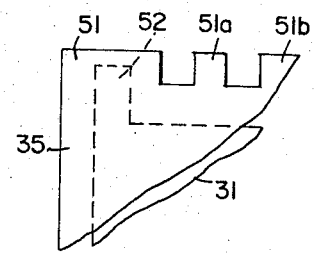
Figure 7C:
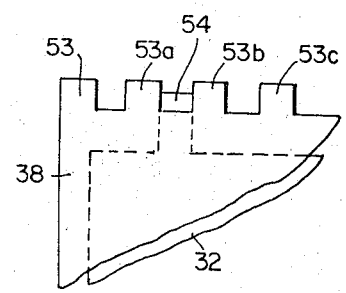
Figure 7D:
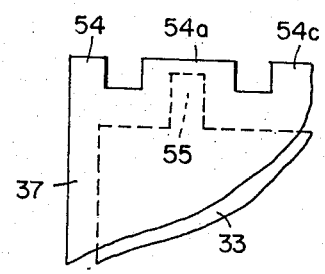
Figure 8:
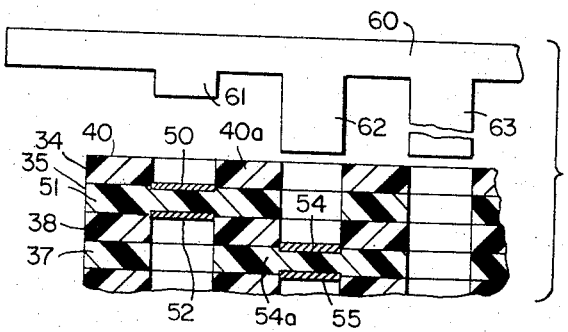
Figure 9:
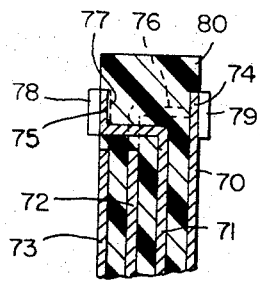
Figure 10:
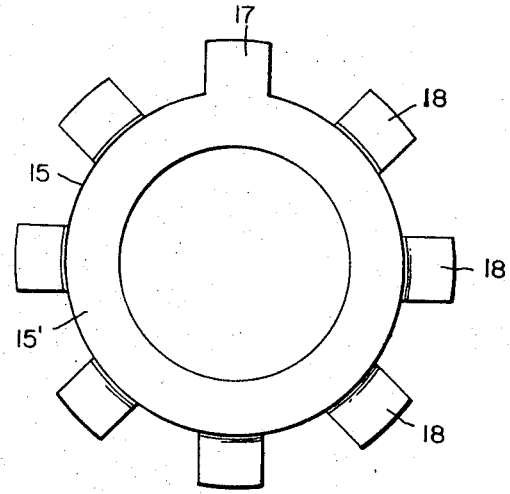
Figure 11:
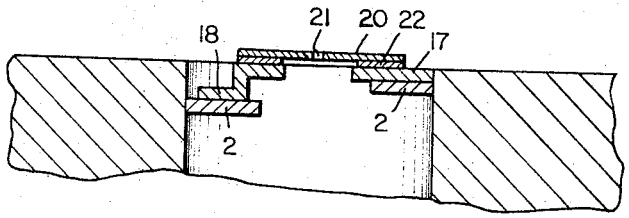

FIG. 8 is a fragmentary top plan view of the embodiment illustrated in FIG. 6, and, FIG. 9 is a fragmentary cross sectional detail of a modification of the embodiment of the invention illustrated in FIG. 6, FIG. 10 is a top plan view of a spider component used as a terminating member for the embodiment of the invention illustrated in FIGS. 1 to 5, and, FIG. 11 is a cross sectional view showing certain components in schematic arrangement which illustrates the manner in which the spider illustrated in FIG. 10 is utilized.

Referring first to the embodiment illustrated in FIGS. 1 to 5 inclusive, there is shown a construction primarily designed to obtain a high Q, low inductance capacitor. The capacitor is built up from the plurality of alternate sheets of dielectric materials and conductive materials. The dielectric materials may comprise any thermoplastic material having good dielectric qualities. The conductive material may comprise any metal material adapted to be formed in very thin sheet form, but preferably is made of metal such as aluminum or copper foil. The metal should, however, have a low resistance in order to obtain the best possible high Q characteristics for the capacitor. It is desirable that the foil be relatively thin. However, it should not be thinner than twice the depth of penetration at the resonant frequency of the circuit.

Figure 1:
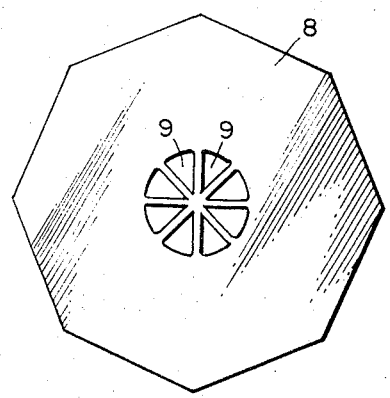
FIGS. 1, 2 and 3 illustrate different components which form the laminations comprising the embodiment of the present invention primarily designed for light source applications, and, coaxial cable terminations.
Figure 2:
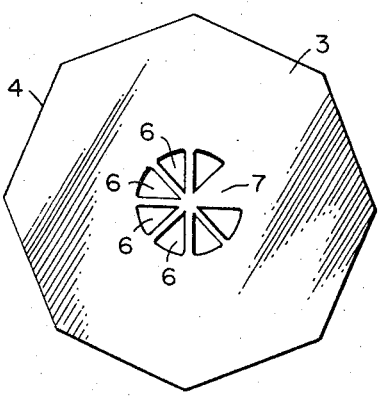

The capacitor is built up of a plurality of alternate dielectric sheets or plates 3 and conductive sheets or plates 1. In the embodiment illustrated in FIGS. 1 to 5 the invention will be described in conjunction with a capacitor having two terminals each with eight taps with each of the taps connected individually to a plate 1. It should be understood, however, that the invention may be embodied in other forms wherein the two terminals are connected to any desired number of plates. As a practical matter, however, no more than thirty-two plates should be used. The conductive plates 1 are preferably annular in configuration. Each plate 1 is provided with a tap 2 formed as a tongue or tab extending radially inwardly from the inner edge 5 of the plate 1. These plates 1 are interposed between dielectric members illustrated in FIGS. 1 and 2 with an orientation as hereafter described. Dielectric plate 3 is octagonal in configuration as indicated at 4. The outer geometry of the dielectric members is determined by the number of taps used in each configuration. In dielectric plate 3 there are provided seven radially arranged pie-shaped cutouts indicated at 6. These cutouts are successively spaced at uniform distances apart about the center of the dielectric plate 3 with an additional section 7 not cutout but having an area substantially the same as cutout section 6. Dielectric plate 8 illustrated in FIG. 1 is similar in configuration to the dielectric plate illustrated in FIG. 2 except, however, that eight pie-shaped cutouts 9 are provided. The cutouts 6 in dielectric plate 3 and 9 in dielectric plate 8 are preferably arranged with their axis extending normally through the side edge of the hexagonal shape of the dielectric plate. This arrangement is provided to facilitate orientation of the plates in assembly. In the arrangement when assembled, a dielectric plate 8 is layed over a conductive plate 1 with the tab 2 overlapping a cutout 9. Under the conductive plate 1 is positioned the dielectric plate 3 with the surface area 7 underlying the tab 2. Beneath this dielectric plate 3 is positioned another foil 1 oriented exactly parallel with the plate 1 previously mentioned and with the tabs 2 coextensive and parallelly aligned, so that the tabs 2 lay on either side of the solid insulating area 7 of dielectric member 3. Beneath this last mentioned plate 1 is positioned another dielectric plate 8. Beginning with a conductive plate, the sequence of conductive and dielectric plates is then repeated. However, in each sequence, the tabs 2 are staggered radially 45° so that they are aligned with the radially successive pie-shaped cutout. Thus, as illustrated in FIG. 4, the tabs of plates 1 which are indicated at 1a are aligned with the apertures or cutouts indicated at 9a. The next lower pair of tabs on the next lower pair of plates indicated at 1b are aligned with aperture 9b. The other plates are similarly arranged around the radius of axis of the capacitor. The lowermost dielectric lamination should be a dielectric plate 8. Thus there is always one more dielectric lamination than plate lamination with the outermost laminations being dielectric plates 8. Dielectric laminations 3 alternate with dielectric laminations 8 as illustrated in FIG. 5.

In FIGS. 10 and 11 there is illustrated an arrangement wherein the capacitor described in FIGS. 1 to 5 may be utilized for the purpose of providing an intense light source discharge. In the arrangement illustrated in FIG. 10 there is provided a spider of conductive material indicated at 15. This spider comprises an annular ring having eight projecting tabs or flanges. One tab 17 is coplanar with the annular ring 15'. The other flanges 18 are flared downwardly in stepped levels. This spider fits over the axis of the capacitor illustrated in FIG. 4. When the spider 15 is utilized, the core of the capacitor as illustrated at FIG. 4 is cut out along a line generally illustrated in FIG. 4 at 19. The spider is then secured with tabs 18 and 17 suitably connected to each of the projecting tabs 2 (FIG. 11). Tab 17 is connected to the uppermost tab 2 while tabs 18 are connected to corresponding tabs 2 of the plates 1 at lower levels. A pair of terminals as illustrated in FIG. 10 may be used on either face of the capacitor in a manner as described and illustrated in FIG. 11. The terminations may then be suitably connected to any desired circuit for use as required. In a specific application for obtaining an intense light source, however, the disc 20 is mounted on the annular ring of the spider. If desired, an intermedate washer of resistive material such as a metallic loaded epoxy resin, may be interposed between the spider 15 and the plate 20. The geometry and physical characteristics of the ring 22 will introduce a resistive load into the capacitive discharge circuit which wll vary the Q of the circuit. In this manner, a critically damped oscillation of the capacitive circuit may be obtained.

It will be noted from a consideration of the spider termination arrangement illustrated in FIG. 10 which is mounted on either side of the capacitor as illustrated in FIG. 4 that substantially any desired type of termination may be effected. In effect, there is provided two parallel rings terminating the plates of the capacitor. These rings may be used for coaxial termination or may be used for connection to various types of electrodes intended to obtain high intensity spark discharges.

It will be noted that the construction described provides an arrangement in which the capacitor may be made by high pressure lamination of thermoplastic materials, with the assembly being completed in a single operation without the requirement of filling or impregnation. Because of the ultra low inductance obtained in this particular capacitor, it is probably necessary in most applications to use added mechanical support or restraint in the form of a casing about the capacitor in order to prevent delamination during electric discharge. It should be noted that this is not a problem normally encountered in capacitors because in most low inductance capacitors, the peak current is not particularly high. However, in this particular arrangement, one is able to obtain peak currents which are substantially in excess of those heretofore obtainable in other capacitors of low inductance.

The number of plates used in the capacitor will always be an even number. For simplification, therefore, one may consider the plates as acting in pairs although there is some interaction between any two adjacent plates. In the embodiment illustrated extensions to pairs of plates are made and so positioned that the extension of alternating pairs of plates are offset from one another in a stepped arrangement. The width of the plate extension is a function of the number of pairs of plates used in the overall layout. That is if ten pairs of plates are used, the width of the extension would be one-tenth the width of the plate less an appropriate separation between pairs of plate extensions. The sheet of plastic dielectric material that separates conducting plates is larger in all dimensions than the metal plates so that appropriate margins are provided for all operating voltage levels.

If desired, a plurality of similar dielectric plates may be interposed between adjacent plates in order to increase the voltage ratings.

To minimize shock hazard, the entire capacitor assembly except for plate extensions may be covered with a thin metallic electrostatic shield. Connection to this electrostatic shield is made at the side of the capacitor opposite the plate extension and the electrostatic shield is insulated to withstand full operating voltage of the plate and has a protective layer of plastic dielectric around it.

In the embodiment of the invention illustrated in FIGS. 6 to 9, there is illustrated a capacitor designed primarily for high energy storage purposes. In this arrangement the low inductive advantages of the ideal two parallel plate capacitors is approached while nonetheless using multiple stacked plates. In this embodiment of the invention a series of taps are arranged from the stacked plates to minimize the inductance of the capacitor. The invention is described in conjunction with the capacitor having a multiple number of taps. However, only four such taps are illustrated in the drawings. In this arangement, there is provided a pair of outer dielectric laminations 34. These laminations 34 are rectangular in shape with the upper edge having a plurality of tabs 40, 40a, 40b, 40c, etc., starting from one side of the capacitor and extending to the other. Between these plates 34 in series, there is provided a metallic plate 30, a dielectric plate 35, a metallic plate 31, a dielectric plate 38, a metallic plate 32, a dielectric plate 37 and a metallic plate 33. Additional laminations of alternate dielectric plates and metallic plates are provided in any desired number dependent upon the number of tabs provided in plates 34. The plates have a tab configuration which varies in sequence in a manner which will be understood from considering the dielectric plates and metallic plates illustrated in FIGS. 7a to d. Dielectric plate 34 is provided with a series of tabs 40, 40a, 40b, 40c, etc. These tabs define recesses having a width somewhat greater than the width of the tabs themselves. The metallic foil 30 is provided with a single tab 50 which projects into the recess defined by the tabs 40 and 40a. The amount that tab 50 projects into this recess, is determined by the voltage rating of the unit. The dielectric plate 35 is provided with tab 51.

The tab 51 has a width substantially equal to the width of tab 40 and 40a and the space therebetween. This tab 51 acts as an insulating member as well as a barrier to prevent voltage creepage between adjacent tabs. Metallic plate 31 is provided with a tab 52 coextensive and in line with tab 50 on plate 30. Dielectric plate 38 is provided with a series of tabs 53, 53a, 53b, 53c, etc., parallel and having the same structural dimensions as the tabs on sheet 34. Metallic sheet 32 is provided with a tab 54 longitudinally spaced from the end edges of the plate 32 and designed to project into the recess defined between tabs 53a and 53b. Dielectric plate 37 is provided with a plurality of tabs 54, 54a, 54b, etc. Tab 54a is substantially wider than the other tabs formed on dielectric plate 37 and has a width substantially equal to the width defined between the opposite side edges of tabs 53a and 53b on dielectric plate 38. This tab serves also as a barrier, an insulating member. Metallic plate 33 is provided with a tab 55 corresponding with and positioned opposite to tab 54 of metallic sheet 32. Additional metallic plates and dielectric sheets may be alternated with every other dielectric sheet each having a single tab wider than the other tabs formed on the edges in a manner as described in conjunction with the dielectric sheets illustrated in FIGS. 7b and d. Each successive dielectric sheet providing a wide tab should have the tab stepped successively longitudinally along its length in a manner as previously illustrated. In this way, an arrangement such as illustrated in FIG. 8 and in FIG. 6 may be effected wherein pairs of tabs such as illustrated at 50, 52 are separated by an insulating tab 51 and tabs 54, 55 are separated by an insulting tab 54a. These tabs may be terminated in opposite terminals in any suitable manner. For example, a terminating bar such as illustrated at 60 may be secured to the face of the capacitor. This bar is formed of an elongated conductive material such as copper having suitable terminal connections not shown. Along its length, there are provided a plurality of prijections of different thicknesses adapted to project into the openings formed by the successive slots. The projection 61 fits between the tabs 40 and 40a and contacts terminal 50. Similarly, contacts are made by the longer tabs 62 and 63.

In a further modification of this invention, as illustrated in FIG. 9, there are provided plates 70, 71, 72 and 73 having projecting tabs which are formed on the outer surface of the capacitor. Thus plate 70 has a projecting tab 74 coplanar with the plate. Plate 71 has a projecting tab 75 formed by bending the tab 75 angularly in a stepped arrangement to the side of the capacitor opposite plate 74. Other plates 72 and 73 are bent in a similar manner as illustrated at 76 and 77. The plates 71 and 73 are connected through their respective tabs 75 and 77 by a terminating bar 78, while plates 70 and 72 are connected by a bar 79 contacting their respective tabs 74 and 76. The intermediate area between the tabs 74 and 76, 77 and 75 is filled with a dielectric material 80 of the same type from which the laminations were molded. The embodiment illustrated in FIG. 9 is illustrative only of the inventive concept as normally more than four plates would be utilized to form a capacitor which has a termination as illustrated.

What is claimed is:

1. A low inductance capacitor formed of a plurality of alternating dielectric and metallic sheets, said metallic sheets each having a projecting tab extending from the edge thereof, said metallic sheets positioned in parallel aligned relation with pairs of said metallic sheets having coextensive tabs oriented to project in staggered relation to tabs of adjacent pairs of metallic sheets, said dielectric sheets each having a plurality of narrow tabs with one wider tab on alternate dielectric sheets, having a width equal to substantially the width of two of said narrow dielectric tabs plus the space therebetween, and said wider tabs interposed between said tabs forming said pairs of coextensive tabs.

2. A low inductance capacitor designed to provide rapid discharge comprising a plurality of alternating dielectric and metallic sheets, said metallic sheets having an annular configuration with a radially oriented tab extending inwardly from the inner edge thereof, said dielectric sheets also having an annular configuration with a radially oriented tab extending inwardly from the inner edge thereof, said metallic sheets parallelly arranged in staggered pairs with the tabs of each pair aligned with one another and successive pairs of tabs radially staggered in spaced relation, said dielectric sheets arranged with one intermediate each pair of metallic sheets, said dielectric tab interposed between said tabs of said parallel sheets.

3. A device as set forth in claim 2 wherein said dielectric sheets intermediate adjacent pairs of metallic sheets have in addition to said projecting dielectric tab, radial projections from said inner edge with said projections aligned with the spaces between said staggered pairs of tabs.

4. A device as set forth in claim 3 wherein said dielectric sheets are polyhedric in shape with one outer edge for each of said pairs of tabs.

5. A device as set forth in claim 4 wherein said dielectric sheets are hexagonal in shape.

6. A capacitor comprising a plurality of annular flat alternating dielectric and metallic sheets, and means forming staggered terminating connections for each of said metallic sheet with all connections to said metallic sheets on the inner edges thereof and with insulating means insulating said connections from each other whereby the inductance of said capacitor is minimized.

7. A device as set forth in claim 2 wherein each of said pairs of parallel metallic sheets are arranged parallel with one another and terminal means on one side of said capacitor formed with a plurality of projecting means connected one each to the metallic tab of the sheet of said pairs closest to said one side.

8. A device as set forth in claim 2 wherein each of said pairs of parallel metallic sheets are arranged parallel with one another, and a pair of terminal means positioned one on each side of said capacitor, said terminal means each having a plurality of projecting means with the metallic tab of each sheet of said pairs closest to one side of said capacitor connected one to each of said projecting means of said terminal means at said side, and with the metallic tab of each sheet of said pairs closest to the other side of the said capacitor connected one to each of said projecting means of the other of said terminal means.

9. A device as set forth in claim 8 wherein said terminal means each have corresponding projecting means aligned with one another, and connected to aligned tabs of said pairs.

10. A device as set forth in claim 9 wherein said terminal means have annular configurations.

11. A low inductance capacitor formed of a plurality of alternating dielectric and metallic sheets, said metallic sheets each having a projecting tab extending from the edge thereof, said metallic sheets positioned in parallel aligned relation with pairs of said sheets having coextensive tabs and with said pairs of said coextensive tabs longitudinally aligned in a stepped relationship, said dielectric sheets each having tab means dielectrically isolating said metallic sheet tabs one from the other with the outer surfaces exposed for terminal connections.

12. A device as set forth in claim 13 wherein said tab means each comprise a plurality of tabs on each dielectric sheet with one wider tab on alternate dielectric sheets having a width equal to the width of adjacent pairs of said coextensive tabs plus the distance therebetween and the other of said tabs on each dielectric sheet equal substantially to the distance between adjacent pairs of said coextensive tabs, said wider tabs interposed between said tabs forming said pairs of coextensive tabs and said other tabs positioned between said pairs of coextensive tabs.

13. A low inductance capacitor formed of a plurality of pairs of parallel metallic sheets, annular in configuration, each sheet in each pair having a tab extending from the inner edge thereof and aligned with the tab of the other sheet in said pair, said pairs of aligned tabs arranged in successive stepped relationship, with dielectric means isolating each sheet and tab within each pair from the other and means on one side of said capacitor electrically interconnecting one tab of each pair and means on the other side of said capacitor electrically interconnecting the other of said tabs of each pair.

References Cited

UNITED STATES PATENTS

| | | | |
|---|---|---|---|
| 942,620 | 12/1909 | Dearlove | 317—261 X |
| 1,994,533 | 3/1935 | Pickard | 317—261 |
| 2,157,715 | 5/1939 | Meggenhofen | 317—261 |
| 2,223,061 | 11/1940 | Ducati | 317—261 |
| 2,279,826 | 4/1942 | Kater | 317—261 |
| 2,523,664 | 9/1950 | Minnium | 317—261 |
| 2,917,688 | 12/1959 | Ritchey | 317—261 |
| 3,011,106 | 11/1961 | Ducati | 317—261 |

FOREIGN PATENTS 209,325  1/1924  Great Britain.

LEWIS H. MYERS, *Primary Examiner.*

SAMUEL BERNSTEIN, WALTER L. CARLSON, E. JAMES SAX, JOHN F. BURNS, ROBERT K. SCHAEFER, LARAMIE E. ASKIN, *Examiners.*

E. A. GOLDBERG, *Assistant Examiner.*